Oct. 26, 1954  C. L. DAY ET AL  2,692,671
CONTAINER FEED SCREW
Filed Dec. 29, 1950
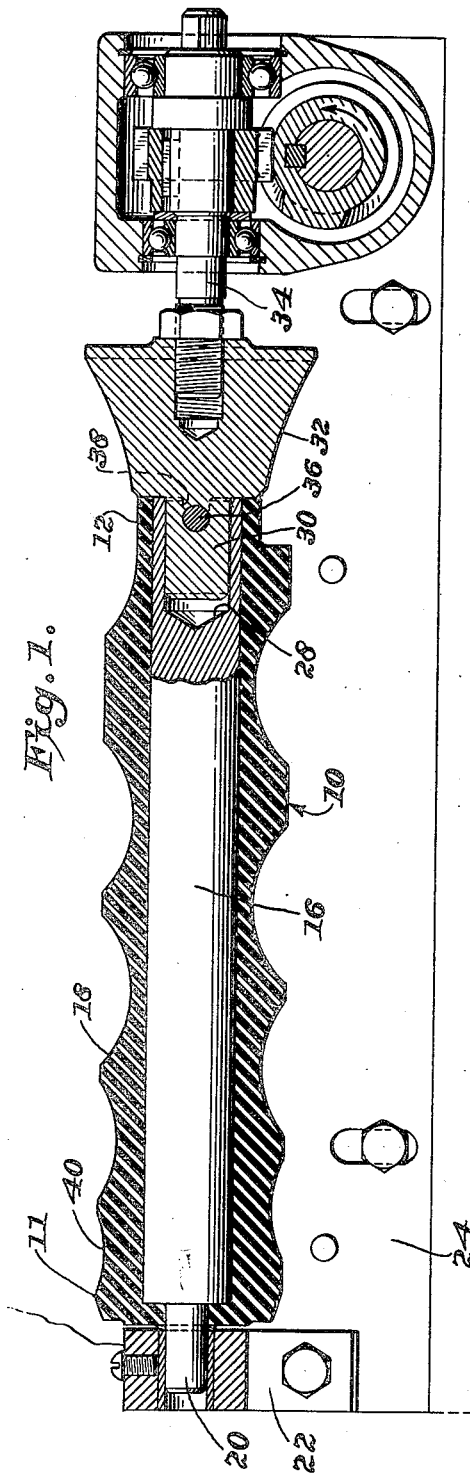
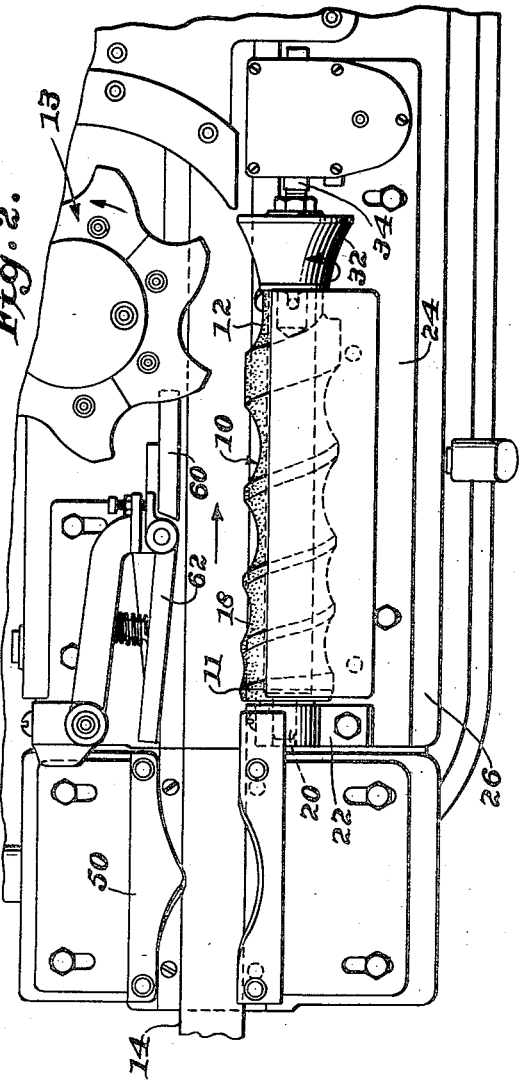
INVENTORS:
Carl L. Day,
Frederick E. Fauth,
BY
ATTORNEYS.

Patented Oct. 26, 1954

2,692,671

UNITED STATES PATENT OFFICE 2,692,671

CONTAINER FEED SCREW

Carl L. Day and Frederick E. Fauth, Baltimore, Md., assignors to Crown Cork & Seal Company, Inc., Baltimore, Md., a corporation of New York Application December 29, 1950, Serial No. 203,514

5 Claims. (Cl. 198—34)

The present invention relates to container feed screws and, more particularly, to a feed screw provided with a container engaging surface formed of rubber.

In the handling of bottles or other containers, and especially during the filling of containers, it frequently is desirable to move the bottles for some distance with the bottles in line and unspaced or spaced at random. However, substantially all of the machinery which performs any operation related to the filling of the containers requires that the containers be spaced apart a fixed distance before they actually are engaged by the machine. For example, at the infeed of most machines in a beverage bottling plant, it becomes necessary to space apart the bottles moving in a line toward such machines.

It heretofore has been proposed that a rotatable screw element provided with a groove of gradually increasing pitch be used to space apart bottles preparatory to their engagement by a bottle handling machine. One such arrangement is disclosed in the application of Carl L. Day and Leo F. Pahl, Serial No. 126,731, filed November 12, 1949, and now Patent No. 2,596,987, for Mixing Apparatus and Method. However, such feed screws have been formed entirely of metal.

We have discovered that the provision of a feed screw having its container engaging surfaces formed of rubber is highly advantageous as compared to a feed screw formed entirely of metal. One advantage naturally arises from the fact that when rubber of the proper degree of resiliency is used, the cans or bottles cannot be scarred or scratched. While it normally is to be expected that the use of rubber on any container engaging surfaces would increase frictional drag, we have found that the fact that bottles and other containers being handled in a filling plant usually are wet, permits the use of rubber on a feed screw without the frictional difficulties which normally would be expected.

It will be understood that the invention is not limited to the use of rubber. For example, any rubber-like material having sufficient resiliency and the frictional qualities of which will be overcome in the presence of water may be used for the covering of the feed screw.

An object of the invention is to provide a feed screw which will move containers without possibility of marring their surfaces.

The provision of a feed screw which will not scratch containers is particularly desirable under present day conditions involving the use of machines which move decorated containers at high linear speeds.

Other objects and advantages of the invention will be apparent from the following specification and accompanying drawing.

In the drawing, Figure 1 shows the feed screw in axial section and also includes a sectional view of a driving means for the screw, and Figure 2 is a fragmentary view of a bottle filling machine showing the manner of mounting the feed screw thereon.

Referring to the drawing, the numeral 10 indicates the feed screw of the present invention, the infeed end of the screw being indicated at 11 and its outfeed end being indicated at 12. As is best shown in Figure 2, the feed screw 10 will be positioned in advance of a container receiving element such as the pocketed infeed dial 13 of a beverage filling machine. Containers will be delivered to the feed screw by a straight line conveyor such as indicated at 14 and which conveyor may either extend entirely past the infeed screw or may terminate slightly in advance of the infeed screw. In the latter case, the containers will be moved to the infeed screw from the moving conveyor by the pressure of containers on the moving conveyor and the feed screw will then advance them along a stationary plate.

As is shown in Figure 1, the feed screw 10 includes a central metal core 16 on which a covering 18 of rubber is molded. The rubber covering is sufficiently resilient that it will not flex to any substantial degree but, nevertheless, is not so rigid that it will scratch containers which become jammed against it. The central core 16 includes a reduced portion 20 extending from the infeed end of the feed screw and adapted to be journalled in a bracket 22 secured to a plate 24.

As is described in said Day and Pahl application, and as is best shown in Figure 2, plate 24 can be adjustably mounted on the upper surface 26 of the stationary table. The bracket 22 preferably is of the split type so that the pin 20 readily can be released therefrom as hereinafter described. The end of core 16 at the outfeed end of the feed screw includes a central recess 28 adapted to receive a stud 30 which extends from a guiding element 32 secured to a driven shaft 34. The stud 30 has a diametrically extending pin 36 fixed therein, the outer ends of the pin being received in pockets 38 in the end of the core 16. The ends of the pins 36 terminate slightly inwardly of the rubber covering at this part of the feed screw so that the pins cannot contact with containers.

As is also described in said Day and Pahl application, the guiding element 32 is concavely curved in diametrical section on a radius substantially concentric with the axis of the infeed dial 13 so that containers moving from the outfeed end of the feed screw will be guided into the pockets of the infeed dial. Rotation of the shaft 34 by means such as described in said application will cause the said screw to rotate about its axis, the speed of this rotation being synchronized with the rotation of the infeed dial.

If it is desired to remove the feed screw for any reason, it is only necessary to release the pin 20 from the journal bracket 22 and the outfeed end of the feed screw then can be withdrawn from the stud 30. During remounting of the feed screw, the engagement of pin 36 with the notches 38 will properly time the feed screw with the infeed dial.

The feed screw 10 illustrated is of the conformation disclosed in said Day and Pahl application in that it is substantially cylindrical in overall form and its groove 40 is of gradually increasing depth from its infeed end 11 to its outfeed end 12, the depth of the groove being zero at the infeed end 11. In the form disclosed, the depth of the recess gradually increases to a point approximately two-thirds of the length of the screw and from that point to the outfeed end, the recess is of uniform depth. In addition, the pitch of the screw also increases from the infeed end 11. By this arrangement, round containers are gradually spaced apart as they move along the feed screw.

The numeral 50 designates a bottle stop element such as disclosed in said Day and Pahl application and comprising two plates spaced above the conveyor, one plate having a concave edge and the other having a convex edge. The purpose of this arrangement is to prevent an overturned bottle from reaching the feed screw. In accordance with usual practice, a guide plate 60 will be positioned on the opposite side of the container supporting conveyor from the feed screw 10, the guide plate serving to hold containers in engagement with the feed screw. As is described in said Day and Pahl application, the guide plate may include a spring-mounted detector plate 62 adapted to be moved outwardly in the event that containers become jammed, such outward movement being relied upon to stop operation of the machine.

It will be observed that when a container moves into engagement with the infeed end of the feed screw 10, it will engage in the groove 40 of the screw. The feed screw will be rotated at such speed as compared to the speed of travel of the conveyor 14 that the feed screw will hold the forward movement of the bottles to a slightly slower linear speed than is imparted to them by conveyor 14. This will insure that the containers will bear upon the leading portion of the feed screw groove. The outfeed end of the feed screw and the guide 32 are of such formation that a container moving from this part of the feed screw will leave the feed screw in synchronism with the pockets of dial 13.

The provision of a rubber covering on the feed screw insures that the containers, whether bottles or cans, cannot be marred during their travel with the feed screw and even if the bottle or can becomes jammed with respect to the feed screw. As has been mentioned above, the fact that the bottles and cans handled in a bottling plant usually are wet because of water thereon makes it unnecessary to lubricate the feed screw in any way to thereby overcome the normal frictional qualities of the rubber covering.

The terminology used in the specification is for the purpose of description and not of limitation, the scope of the invention being defined in the claims.

We claim:

1. In combination, means to support random spaced containers for movement along a straight line, means to receive the containers in uniformly spaced relation, means adjacent said container supporting means to space apart containers and deliver them to said container receiving means comprising a guide plate extending along one side of said container supporting means, an element of generally cylindrical form positioned at the opposite side of said container supporting means with its axis substantially parallel to the path of movement of containers with said container supporting means, said element being provided with a helical container engaging groove extending along its circumference and increasing in pitch toward said container receiving means, the container engaging portion of said element being formed of rubbery material, and means to rotate said element about its axis to thereby constantly present a new surface portion to a container entering said element.

2. The combination described in claim 1 wherein said container receiving means comprises a pocketed dial.

3. A feed screw element for engaging the peripheral surfaces of containers, said element being of generally cylindrical form and provided with a helical groove of increasing pitch in one direction extending along its circumference, the container engaging portion of the element being formed of rubber of such surface characteristics as to be water-lubricated.

4. An element of the character described in claim 3 including a central metal core.

5. An element of the character described in claim 3 wherein the helical groove is of increasing depth in one direction lengthwise of the element.

References Cited in the file of this patent

UNITED STATES PATENTS

| Number | Name | Date |
| --- | --- | --- |
| 703,190 | Geurink | June 24, 1902 |
| 1,423,698 | Thurston | July 25, 1922 |
| 1,649,267 | Tevander | Nov. 15, 1927 |
| 1,824,858 | Williams | Sept. 29, 1931 |
| 1,993,109 | Merritt | Mar. 5, 1935 |
| 2,235,052 | Trier | Mar. 18, 1941 |
| 2,461,277 | Hohl et al. | Feb. 8, 1949 |